June 23, 1953  E. R. SHENK ET AL  2,643,359
PROTECTIVE CIRCUITS
Filed June 30, 1948
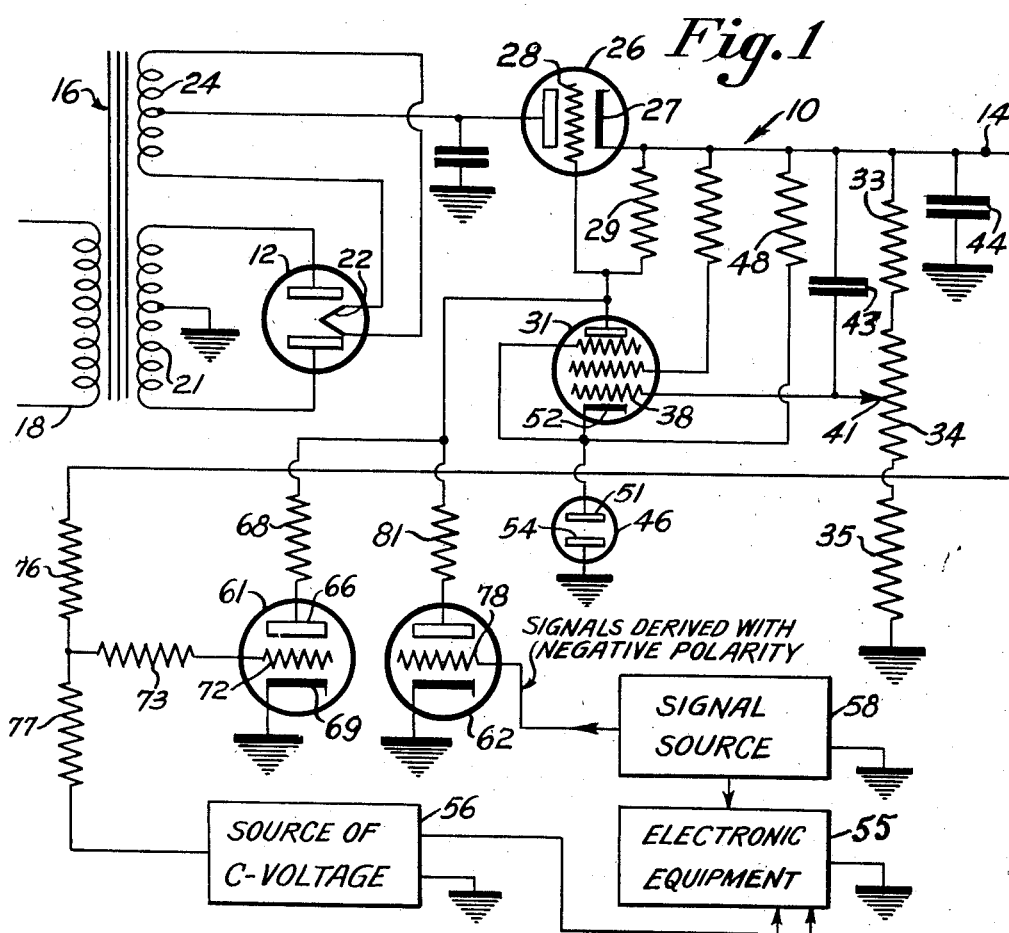
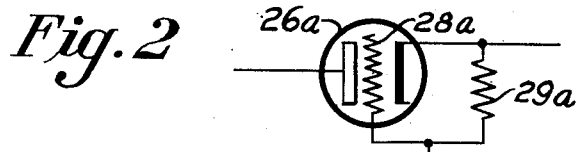
Inventors
*Eugene R. Shenk and
Anthony Liguori*

Patented June 23, 1953

2,643,359

UNITED STATES PATENT OFFICE 2,643,359

PROTECTIVE CIRCUITS

Eugene R. Shenk, Brooklyn, and Anthony Liguori, New York, N. Y., assignors to Radio Corporation of America, a corporation of Delaware Application June 30, 1948, Serial No. 36,193

2 Claims. (Cl. 323—20)

The present invention relates to protective circuits and more particularly, but not necessarily exclusively, to a protective arrangement for electronic apparatus which functions in accordance with changes in circuit or apparatus operating conditions, or circuit or apparatus failures, by exercising control over a source of polarizing and/or bias voltages for the electronic equipment which is to be protected.

In accordance with the invention in its preferred form, a tube is maintained in the non-conducting or substantially non-conducting state when all conditions of the equipment to be protected are normal. One or more of these tubes may be employed. For example, in electronic apparatus such as a repeater, amplifier or the like, bias or polarizing voltages and signal voltages normally exist at more or less definite levels. Departures from these levels may cause tube overloading or other disturbing effects. The tube or tubes mentioned above which is or are maintained in the non-conducting state during normal operation of associated equipment are so arranged, in accordance with the invention, as to reduce the anode supply voltage for this equipment. In accordance with the invention, protection against one or many conditions can be had by including one or more tubes each of which is maintained in the non-conducting or substantially non-conducting state in response to normal operation of several parts of the equipment. For example, if an input signal to an amplifier is applied to the grid of the tube which is to be maintained non-conducting the non-conductive or the conductive state of the tube will be had in response to variations of this input signal. The sense of polarity of the voltage applied to the grid of this protective tube can be selected so as to provide the protective effect which is the aim of this invention.

The principal aim or object of this invention, therefore, is to provide protection circuits which are responsive in a novel manner to one or more conditions of operation of electrical apparatus or equipment such as, for example, electronic equipment.

Another object is to provide a power supply having a novel means therein for obtaining a protective effect in a novel manner.

A further object is to provide a power supply having one or more protective tubes incorporated therein the conductivity of which is determined in accordance with the conditions of operation of electrical equipment associated with or fed from said power supply.

Other objects and advantages of the present invention will, of course, become apparent and immediately suggest themselves to those skilled in the art to which the invention is directed from a reading of the following specification in connection with the accompanying drawing in which:

Fig. 1 shows, diagrammatically, one suitable form of power supply apparatus embodying the invention; and Fig. 2 is a fragmentary diagrammatic showing of another embodiment.

Referring to the drawing, and for the present to Fig. 1 thereof, reference character 10 indicates a power supply or power pack of the type including a full wave rectifier 12 and voltage regulating means for supplying regulated positive voltage from a point or terminal indicated schematically by reference character 14. More in detail, and for the sake of completeness of description, a power transformer 16 having a primary winding 18 and a secondary winding 21 is energized from a suitable source such as a conventional alternating current power line. Energization of the transformer causes the full wave rectifier 12 to operate in the usual and well known manner to provide a rectified voltage in accordance with alternate current flow at the rectifier anodes. The filamentary cathode 22 of the rectifier is heated from an auxiliary secondary 24 of the transformer and is connected to the terminal 14 through a series connected tube 26 which acts as a controlled variable resistance. The cathode 27 of this tube and its grid 28 are connected together through a resistor 29 which serves as a bias resistor for the tube 26 as well as serving as a load resistor for a control amplifier tube 31. A bleeder comprising a plurality of resistors, for example, resistors 33 to 35 is connected across the output of the power supply 10. In the illustrative arrangement this is accomplished by connecting the bleeder between the terminal 14 and a reference point in the power supply 10 as well as the associated electronic apparatus. In the illustrative arrangement this reference point is indicated as being ground.

In the illustrative arrangement the bleeder composed of the resistors 33 to 35 serves as an amplifier grid bleeder for biasing the control grid 38 of the control tube 31. With this purpose in mind the resistor 34 is in the form of a potentiometer having adjustable connection 41 to which the grid 38 is connected. The condenser 43 serves as a grid coupling condenser which presents a low impedance path to the grid for possible high and medium frequency changes in the output. An output filter condenser 44 is connected across the power supply 10 between the terminal 14 and the previously mentioned reference point indicated as ground in the illustrative example.

A voltage regulator tube 46, for example, a type VR105 tube is connected through a resistor 48 to the high positive potential point 14 of the power supply 10. The anode 51 of the tube 46 is connected to the end of the resistor 48 more remote from the terminal point 14 and to the cathode 52 of the tube 31. The cathode 54 of the tube 46 is connected to ground in the illustrative example. The tube 46 holds the cathode 52 of the tube 31 at a fixed point above ground. The tube 31 amplifies variations appearing across the bleeder and these amplified variations appear in inverted form across the resistor 29 which serves as the bias resistor for tube 26 and produces an inverted effect in the tube 26 which is substantially equal but opposite in phase. Cancellation of effects in the tube 26 produces the regulated voltage at the terminal 14.

The power supply 10 described in the foregoing is of a type which is by now well known and it has been selected as an illustrative setting for the invention. It will be understood that many changes may be made in the power supply 10 without in any way altering the present invention and the beneficial results thereof to be attained in practice. Electrical equipment, such as electronic equipment 55, for example, is shown schematically as being connected to the terminal 14. It will be understood that the power supply 10 may be employed to furnish the B— supply voltage for single and multistage amplifiers of many types. For example, the power supply 10 may be employed to furnish anode voltage for an amplifier to be used in a facsimile recorder the output of which feeds a recording lamp such as a crater lamp. With this application, cited by way of example, in mind it is advantageous to protect the amplifier (not shown) against failure of negative grid bias on the tubes of the amplifier stages. For example, a negative grid bias source 56 is shown conventionally and by way of example which may be a bias source for equipment 55 such as an amplifier of any type (not shown in detail) which is to be fed from the power supply 10. Also, with the assumed use of the invention, signals which are to be recorded by a recorder may be derived with negative polarity. Reference character 58 indicates schematically such a signal source.

In accordance with the invention one or more protective tubes 61 and 62 are provided. In the illustrative example, the tube 61 protects the apparatus 55, for example, associated with the power supply 10 upon failure of bias voltage applied on tubes of the associated apparatus. The tube 62 protects the associated apparatus upon occurrence of an unforeseen change in the input signal applied to said apparatus. For example, the change to be protected against may be a signal having an unduly high amplitude. Inasmuch as the tubes 61 and 62 function in somewhat the same manner in accordance with the invention a description will be given of the tube 61 and its associated circuits and operative effects. The anode 66 of the tube 61 is connected by way of a resistor 68 to the end of the resistor 29 which is more remote from the terminal 14 of the power supply 10. The cathode 69 of this tube is connected to ground. In order that the tube 61 may be responsive to failure of a bias voltage, for example, the voltage provided by the source 56, the grid 72 is connected to a voltage divider through a grid resistor 73. In the illustrative example, the voltage divider just mentioned comprises resistors 76 and 77 which are connected to the terminal 14 of the power supply 10, and the source of biasing voltage 56. As stated above, one or more protective tubes may be employed and in the illustrative example the protective tube 62 has its grid 78 connected to the signal source 58. The anode of this tube is connected to the resistor 29 through a resistor 81.

When both the power supply 10 and the bias source 56 are functioning and signal is present, from 58 or its equivalent, the tubes 61 and 62 will be non-conducting due to negative bias on their grids. The action of the power supply 10 will not be affected. If C— voltage, for example from the source 56, is removed or even greatly decreased, the tube 61 will start to conduct. Current will be drawn through resistors 68 and 29, lowering the voltage on the grid 28 of the tube 26 and causing that tube to approach cutoff. Current flow through the tube 26 will be greatly diminished and the voltage available at the terminal 14 will be reduced considerably. The magnitude of the resistor 68 helps to determine the extent of the reduction in the output voltage of the power supply 10. A similar operation occurs in the event of loss of received or derived signal, for example, from the signal source 58, in which case the tube 62 and the resistor 81 perform in the same manner as the tube 61 and the resistor 68 in the case of loss of C— voltage. This will keep the various tubes (not shown), that are supplied from the power supply 10, from drawing excessively high currents and possibly burning out or being permanently damaged.

It will be understood that while triodes are shown by way of example for convenience, any type of tube may be used for the tubes 61 and 62. For example, pentodes or tetrodes may be used as well as beam power tubes. The system as shown illustratively is self-restoring, that is to say, the B+ voltage is automatically restored when C— is re-applied or when the signal condition returns to normal.

Fig. 2 shows an arrangement in accordance with the invention which is not self-restoring. In the system of Fig. 2, manual restoring means are provided. A fragmentary part only of the arrangement of Fig. 1 is shown which includes the tube 26a corresponding in function to the tube 26 of Fig. 1. The tube 26a is provided with a control grid 28a connected in circuit with a biasing resistor 29a. In the illustrative arrangement of Fig. 2, a protective tube 91 becomes conductive upon failure of the C— voltage. This is provided for by the resistors 76a and 77a and the connection through the resistor 73a to the grid 93. The tube is preferably of the gaseous type such as, for example, a Type 884 tube. The anode 96 of the tube is connected through a lamp 98 and a resistor 68a to the resistor 29a. The connection 101 may be made as in Fig. 1, for example. A switch 102 of the normally closed type provides for interrupting the circuit through the tube to extinguish it.

In operation of the arrangement of Fig. 2 when the C— voltage fails, the tube 91 "fires" or becomes conductive to decrease the conductivity of the tube 26a. If the lamp 98 is included, as suggested herein, a visual indication of the circuit fault is given. The lamp 98 may be a low current incandescent lamp, or it may be a suitable type of glow lamp.

To restore operation of the protective system, the switch 102 is momentarily opened which extinguishes the tube 91.

Having now described the invention, what is claimed and desired to be secured by the Letters Patent is the following:

1. In a protective system for electronic equipment, a voltage supply source for said electronic equipment, said voltage supply source including a series connected control tube, a biasing resistor in the control circuit for said tube, a regulator tube in series with said biasing resistor adapted to increase the bias of said control tube in response to increased output of said voltage supply source and to decrease such bias in response to decreased output, whereby to maintain such voltage output substantially constant, a protective tube for said electronic equipment, said protective tube also having its space discharge circuit connected in series with the biasing resistor for said control tube, said protective tube having a control electrode, a signal source for feeding signals to said electronic equipment, means responsive to signals generated by said signal source for maintaining said protective tube in a substantially non-conductive condition during generation of signals by said signal source, said protective tube passing current when said signal source ceases to generate signals, said protective tube current traversing the biasing resistor for said control tube to decrease conductivity of said control tube and thereby to protect said electronic equipment.

2. In a protective system for electronic equipment, a voltage supply source for said electronic equipment, said voltage supply source including a series connected control tube, a biasing resistor in the control circuit for said tube, a regulator tube in series with said biasing resistor adapted to increase the bias of said control tube in response to increased output of said voltage supply source and to decrease such bias in response to decreased output, whereby to maintain such voltage output substantially constant, a plurality of protective tubes for said electronic equipment each having its space discharge circuit connected in series with the biasing resistor for said control tube, the first of said protective tubes having a control electrode, a signal source for feeding signals to said electronic equipment, means responsive to signals generated by said signal source for maintaining said first protective tube in a substantially non-conductive condition during generation of signals by said signal source, said first protective tube passing current when said signal source ceases to generate signals, said protective tube current traversing the biasing resistor for said control tube to decrease conductivity of said control tube and thereby protect said electronic equipment, a negative voltage source for said electronic equipment, the second of said protective tubes having a control electrode, a connection from said control electrode of said second protective tube to said negative source, said second protective tube passing current when said negative source fails, said second protective tube current traversing the biasing resistor for said control tube to decrease conductivity of said control tube.

EUGENE R. SHENK.
ANTHONY LIGUORI.

References Cited in the file of this patent

UNITED STATES PATENTS

| Number | Name | Date |
|---|---|---|
| 2,318,644 | Tubbs | May 11, 1943 |
| 2,398,916 | Brewer | Apr. 23, 1946 |
| 2,407,458 | Spielman | Sept. 10, 1946 |
| 2,419,496 | Lord, Jr. | Apr. 22, 1947 |